United States Patent [19]

Stephan et al.

[11] Patent Number: 4,564,906
[45] Date of Patent: Jan. 14, 1986

[54] DEVICE FOR ALTERING GEAR-SHIFTING SEQUENCE IN RELATION TO VEHICLE LOAD

[75] Inventors: Wolfgang Stephan, Weinstadt; Heinz Rieker, Waldenbuch, both of Fed. Rep. of Germany

[73] Assignee: Daimler-Benz Aktiengesellschaft, Fed. Rep. of Germany

[21] Appl. No.: 338,862

[22] Filed: Jan. 12, 1982

[30] Foreign Application Priority Data

Jan. 15, 1981 [DE] Fed. Rep. of Germany ....... 3101056

[51] Int. Cl.$^4$ .......................... F16H 5/66; B60K 41/08
[52] U.S. Cl. ................................ 364/424.1; 74/752 D
[58] Field of Search ...................... 364/424.1, 442, 703; 74/857, 859, 866, 752 D; 192/0.098; 340/52 F

[56] References Cited

U.S. PATENT DOCUMENTS

| | | | |
|---|---|---|---|
| 3,673,391 | 6/1972 | Lougheed | 364/703 |
| 3,943,341 | 3/1976 | Corsi et al. | 364/703 |
| 4,198,882 | 4/1980 | Kiencke et al. | 74/866 |
| 4,291,594 | 9/1981 | Baudoin | 74/857 |
| 4,294,341 | 10/1981 | Swart | 74/866 X |
| 4,312,249 | 1/1982 | Hau et al. | 74/866 |
| 4,320,381 | 3/1982 | Olivier | 340/52 F |
| 4,353,272 | 10/1982 | Schneider et al. | 74/859 |
| 4,361,060 | 11/1982 | Smyth | 74/866 |
| 4,368,798 | 1/1983 | Meyerle et al. | 192/0.098 |
| 4,476,530 | 10/1984 | Pannier et al. | 364/424.1 |

FOREIGN PATENT DOCUMENTS

| | | | |
|---|---|---|---|
| 0007881 | 2/1980 | European Pat. Off. | 364/442 |
| 1430243 | 12/1968 | Fed. Rep. of Germany | 364/424.1 |
| 1957131 | 10/1970 | Fed. Rep. of Germany | 364/424.1 |
| 2336772 | 1/1974 | Fed. Rep. of Germany | 364/424.1 |
| 2321616 | 11/1974 | Fed. Rep. of Germany | 364/424.1 |
| 2338122 | 2/1975 | Fed. Rep. of Germany | 364/424.1 |
| 2748227 | 6/1978 | Fed. Rep. of Germany | 364/424.1 |

Primary Examiner—Felix D. Gruber
Attorney, Agent, or Firm—Craig & Burns

[57] ABSTRACT

An improvement comprising a device for determining a recommended gear-shifting of a transmission of a motor vehicle, especially a commercial motor vehicle, which is powered by an internal combustion engine and which is provided with a transmission having gradient speeds. In operation, measured values are provided for determining current operating points, with the measured values being compared with values of an optimum range of the engine performance characteristic with regard to fuel consumption. Measuring sensors are fitted for sensing at least one of the engine speed, the engine torque, and the speed of the vehicle. A computing unit is provided to which measured values and a driver-selected mass signal are fed and which produces gear-shifting signals when the processed measured values give quantities which lie either above or below a predetermined value range which is oriented on a curve of minimum specific fuel consumption of the engine and which is defined, as far as possible, by limiting values or shifting limits which are symmetrical in terms of fuel consumption to the values of the curve of minimum fuel consumption. A distance between the limiting values of shifting limits is proportional to a size of one gear ratio spacing in the transmission.

2 Claims, 8 Drawing Figures

DEVICE FOR ALTERING GEAR-SHIFTING SEQUENCE IN RELATION TO VEHICLE LOAD

The present invention relates to an improvement which comprises an apparatus for determining gear-shifting signals for a motor vehicle, especially a motor vehicle, which is powered by an internal combustion engine and provided with a transmission with gradational speeds, wherein, in operation, measured values for determining a current operating point of the transmission are obtained and compared with values of an optimum range of engine performance characteristics with respect to fuel consumption wherein the values are manually selected by the driver.

Processes and apparatus for generating a gear-shifting signal for controlling a transmission have been proposed in, for example, Offenlegungsschrift Nos. 2,748,227 and 2,336,772. Some of these proposed apparatus are intended to determine a current instantaneous operating point of a power unit of a motor vehicle and to determine whether the power to be provided by the power unit may be furnished more favorably in terms of fuel consumption, i.e., less fuel consumption, in another gear.

Although the above-noted proposed apparatus may also be installed in passenger motor vehicles, such apparatus nevertheless achieved a greater efficiency when installed in commercial vehicles and, especially in trucks, since the transmissions of commercial vehicles have more gradational speeds than passenger motor vehicles. Thus, a commercial vehicle such as a truck may develop the same power in several gears with different fuel consumptions. While it is possible to provide a direct control of the transmission, it is also possible for shift signals to be displayed to the operator of the vehicle so as to recommend the gear in which the engine power may be developed with the least fuel consumption.

In the proposed constructions, the criterion for shift signals was whether the engine exceeds or remains within the engine speed limits which arise from ratio-spacings between the individual gears and which may be adjusted as a function of a load on the engine. In, for example, Offenlegungsschrift No. 2,338,122, it has been proposed to, for example, prevent an up-and-down gear shifting when differing road grades are negotiated to take into account the vehicle acceleration when determining the shifting points.

In Offenlegungsschrift No. 2,748,227, the construction is proposed for an engine performance characteristics, together with fuel consumption curves are utilized for determining shifting points of the transmission. However, a disadvantage of this proposed construction resides in the fact that, since the relationship between engine power, engine speed and fuel consumption is taken into account only in a greatly simplified manner in this proposed process and apparatus, the fuel saving is to be expected at most in a lower speed performance range of the engine and a range of high engine speeds and powers, which is of particular interest, is not contemplated. Moreover, in the proposed process, different ratio-spacings between individual gears are represented by way of replacement by a constant average value as a result of which the operational capability of the system is impaired in case the transmission is not geometrically gradated.

The aim underlying the present invention essentially resides in providing an improvement comprising a device for determining shifting signals in response to a manual input which are defined more precisely than previously so as to further reduce the fuel consumption of a motor vehicle provided with the apparatus of the present invention.

In accordance with advantageous features of the present invention, measuring sensors are provided which are adapted to sense engine speed, engine torque, speed of the vehicle and further operating characteristics or parameters, with a computing unit being provided which is adapted to receive the measured values and a manually-selected mass signal representative of vehicle load to produce gear-shifting signals when the processed measured values for the driver-specified load give quantities which lie either above or below a predetermined value range which is oriented on a curve of a minimum specific fuel consumption $b_{min}$ of the engine and which is defined, as far as possible, by limiting values, i.e., shifting limits, which are symmetrical in terms of fuel consumption to values of the curve. The distance between the limiting values is proportional to the size of one gear-ratio spacing in each case. The expression symmetrical in terms of fuel consumption means that the fuel consumption is established at two shifting limits in the case of equal engine power. The shift signals determined in this manner are either used for automatic control of the transmission of a vehicle or provided as a signal to the driver as a gear shifting recommendation by, for example, a display device or the like.

An advantage of the present invention resides in the fact that an instantaneous operating point of the engine is determined through the measured values transmitted by the measuring sensors and the computing unit having received a driver-selected mass signal, checks whether the operating point lies in an optimum operating range with respect to fuel consumption, the limits of which have a distance between them corresponding to the particular gear-ratio spacing and run largely symmetrically, in terms of fuel consumption, with respect to the curve of minimum specific fuel consumption, that is, maximum engine efficiency. When the instantaneous operating point of the engine lies within the optimum operating range, the no-shift signal is generated by the computing unit; however, when the operating point lies above or below the optimum range, a signal for shifting to a lower or higher gear is generated.

By virtue of the features of the present invention, i.e., the formation of limits bounding the optimum operating range designated below is the shift up and shift down limits, it is insured that, after a shifting operation is carried out in accordance with the new process of the present invention, that first the engine power is available as was required before the shift and, second, the engine operating point is located nearer to a limit of maximum efficiency than was the situation before the shifting.

It is also possible in accordance with advantageous features of the present invention, for the limiting values bounding the optimum operating range to be adjusted as a function of the vehicle acceleration and grade of the road on which the vehicle is operating. The driver-selected mass signal specifies the uphill or downhill grade of the road and/or mass of the vehicle. If, for example, the engine operating point lies on a portion of a shift down limit which is associated with the greatest possible engine power, it follows that the vehicle is to be accelerated sharply on an extreme road gradient must be negotiated. If, under these operating conditions, the engine speed approaches the speed value at which the maximum engine speed would occur because of a shift down operation, then a shift down is advisable only if the maximum engine power is required for negotiating and ascending the road gradient at high speeds. On the other hand, during acceleration operations, a shift down would not be worthwhile when this point is approached since, after a shift to the next gear, the shift-up limit would quickly be exceeded, and consequently, a range in which it would be necessary to shift up again would then be reached. Therefore, it is advantageous to adjust the shifting limit as a function of the vehicle acceleration.

If one takes into account the load gradient for determining the shift signals, such proves favorable when, for example, negotiating ascending grades, a lowering of the vehicle speed during a shifting operation must be taken into consideration. In this situation, the vehicle should be shifted to the next higher gear only at a higher engine speed than that determined by the original shifting limit. Conversely, when the vehicle speed increases during a shifting operation on descending gradients, the points of the shifting up limit may be adjusted toward lower engine speeds.

Advantageously, in accordance with the present invention, different transmission efficiencies in the individual speeds, as a function of engine power and engine speed in a curved pattern of the shifting limits may be taken into account so as to allow for the fact that, in case of a constant attractive force of the vehicle, i.e., a uniform road gradient and a uniform vehicle speed, only a lower engine power is required if the efficiency after the shifting operation is greater than in the gear selected before the shifting operation. The result of this is that, with a view toward the least possible fuel consumption, a shift up of the transmission would be made at a lower engine speed than indicated by the original shift-up limit and thus, an even better fuel saving may be achieved.

In accordance with advantageous features of the apparatus of the present invention, a measuring sensor is provided on the toothed rim of the flywheel of the engine, with the sensor transmitting signals to the computing unit which correspond to the rotational speed on the toothed rim. The measuring sensor may, for example, be constructed as a inductive pick-up and be adapted to transmit electrical pulses, the frequency of which is proportional to a current or instantaneous speed of rotation of the toothed rim of the flywheel thereby enabling the measuring of the engine speed.

Since engine power is determined by multiplying the torque by the engine speed, relative measuring errors of the two quantities are accumulative in the most unfavorable situation; therefore, it is advantageous to utilize the engine torque directly for determing the shift signals rather than engine power. With, for example, engines having fuel injection, the engine torque may be measured in an advantageous manner by utilizing an opening time of the injection nozzles as an indirect measured quantity for determining the engine torque. In diesel engines, a required measuring sensor or detector may be fitted so that it senses or detects a movement of a nozzle needle in the injection nozzle and thus supplies a start and stop signal for enabling a time measurement. In this situation, no special demands are made on the electrical signal processing since time measurement may be carried out in a simple manner and with high accuracy by electronic means.

To enable a reduction in unavoidable idle times, the measuring sensor or detector may be disposed at each cylinder; however, the engine torque may also be determined, in a conventional manner, by way of a torque measuring shaft with a wire strain gauge and, with gasoline operated engines, indirectly by measuring a position of the throttle or intake pipe vacuum at a carburetor.

In order to enable a mass of the vehicle to be accounted for when the shift signals are determined, it is favorable if the apparatus has a switch which may be actuated by a driver of the vehicle which is intended for transmitting to the computing unit a signal corresponding to the mass of the vehicle. Such a switch may, for example, have three selectable ranges such as "0, ½, 1", thereby enabling the particular loading state of the vehicle to then be taken into account by the apparatus when the gear shifting recommendation is determined. Such a construction allows the vehicle mass to be taken into account in a simple and inexpensive manner.

In order to enable a determination of gear ratios, in accordance with further features of the present invention, it is advantageous if, next to the measuring sensor for the engine speed which is the same as the transmission engine speed, a further measuring sensor is disposed which transmits signals to the computing unit as a function of the transmission output speed. The signals from the two measuring sensors or detectors may be sent to two electrical counters which function so as to add up both signals until the number of pulses corresponding to the transmission output speed has reached a definite preset value. In this process, the counters begin to add, in response to a common start signal, the pulses flowing in accordance with the transmission speed and the transmission output speed. As soon as the counter for adding the transmission output speed has reached a value which may be preset, a counting of the transmission speed is also stopped, with the value of the counter then corresponding exactly to the current gear-ratio value thereby enabling an exact determination of the gear ratio without a sensing of the gear shifting mechanism.

Accordingly, it is an object of the present invention to provide an improvement for determining gear-shifting signals for a motor vehicle which avoids, by simple means, shortcomings and disadvantages encountered in the prior art.

Another object of the present invention resides in providing an improvement for determining gear-shifting signals for a motor vehicle which insures the operation of an engine of the motor vehicle in an optimum range of performance characteristics with regard to fuel consumption.

Yet another object of the present invention resides in providing an improvement for determining gear-shifting signals for a motor vehicle, especially a commercial motor vehicle, which enables a precise definition of shift signals so as to insure an optimum performance of the vehicle.

A further object of the present invention resides in providing an improvement for determining gear-shifting signals for a motor vehicle, especially a commercial motor vehicle, which is capable of taking into account the vehicle mass.

A still further object of the present invention resides in providing an improvement for determining gear-shifting signals for a motor vehicle which are adapted for use with either a manual or automatic transmission.

Another object of the present invention resides in providing an improvement for determining gear-shifting signals for a motor vehicle which function reliably under all load conditions, an engine of the vehicle.

Yet another object of the present invention resides in providing an improvement for determining gear-shifting signals which insure the operating of an engine of the vehicle at maximum efficiency.

These and other objects, features, and advantages of the present invention will become more apparent from the following description when taken in connection with the accompanying drawings, which show for the purposes of illustration only, one embodiment in accordance with the present invention and wherein.

Figure 1:
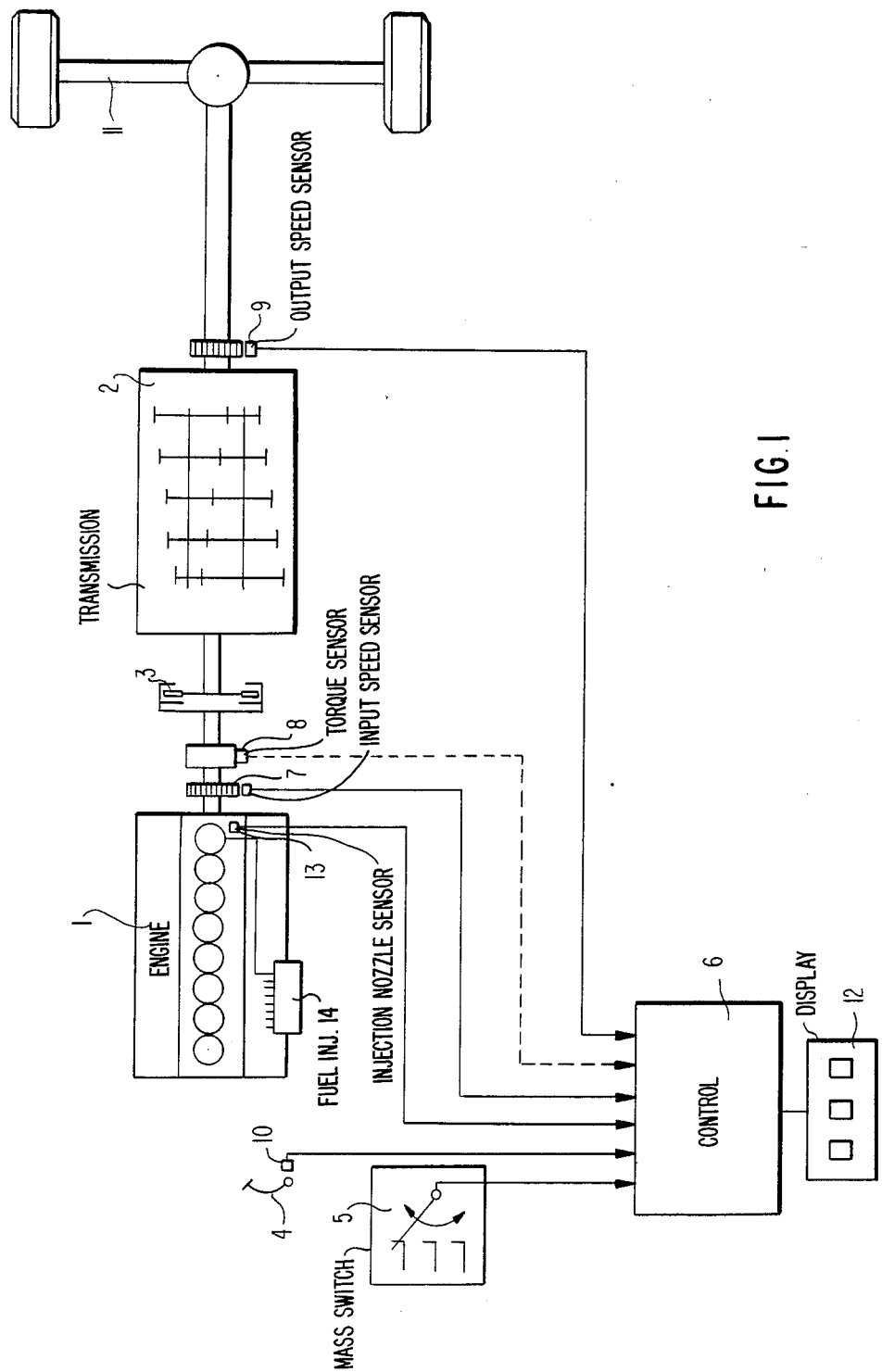
FIG. 1 is a schematic view of an engine and a transmission arrangement provided with an apparatus for determining gear-shifting signals constructed in accordance with the present invention.

Before describing, in detail, the particular improved apparatus for determining gear-shifting signals or recommendations in accordance with the present invention, it should be observed that the present invention resides primarily in a novel structural combination of conventional, mechanical and electronic components and not in the particular detailed configurations thereof. Accordingly, the structure, control, and arrangement of these conventional components have, for the most part, been illustrated in the drawings by readily understandable block representations and schematic diagrams which show only those specific details that are pertinent to the present invention, in order not to obscure the disclosure with structural details which will be readily apparent to those skilled in the art having the benefit of the description herein. Thus, the block diagram illustrations of the figures do not necessarily represent the mechanical structural arrangement of the exemplary system, but are primarily intended to illustrate the major structural components of the system in a convenient functional grouping whereby the present invention can be more readily understood.

Referring now to the drawings wherein like reference numerals are used throughout the various views to designate like parts and, more particularly, to FIG. 1, according to this figure, an engine 1 is adapted to drive a driven axle 11 through a clutch 3 and a transmission 2. A means is provided for determining an operating point of the combination of the engine 1 and transmission 2, with such means including a measuring sensor 7 for determining an engine speed or an input speed of the transmission, a measuring sensor 9 for determining a transmission output speed, a switch 10 such as, for example, a kick-down switch for determining an accelerator-pedal position, a measuring sensor 13 for determining an injection period at injection nozzles of the engine 1 or, alternatively, a measuring sensor 8 for directly determining engine torque, as well as a switch 5 for ascertaining a mass of the vehicle in which the engine is arranged. The output parametric signals from the respective sensors and switches are supplied to a control means 6 which is adapted to determine from the values represented by the output signals fed to it shift signals which enable the driver to receive a gear shifting recommendation by, for example, a visual and/or an acoustic signaling device 12. For this purpose, the device 12 may be accommodated in a cab of a motor vehicle in, for example, an area of a dashboard of the vehicle, so that it may be readily seen at all times by the driver. It is also possible in accordance with the present invention, to direct an output control signal from the computing unit to an automatic transmission (not shown) for the purpose of controlling a gear shifting operation of the automatic transmission in dependence upon the measured parameters.

Figure 2:
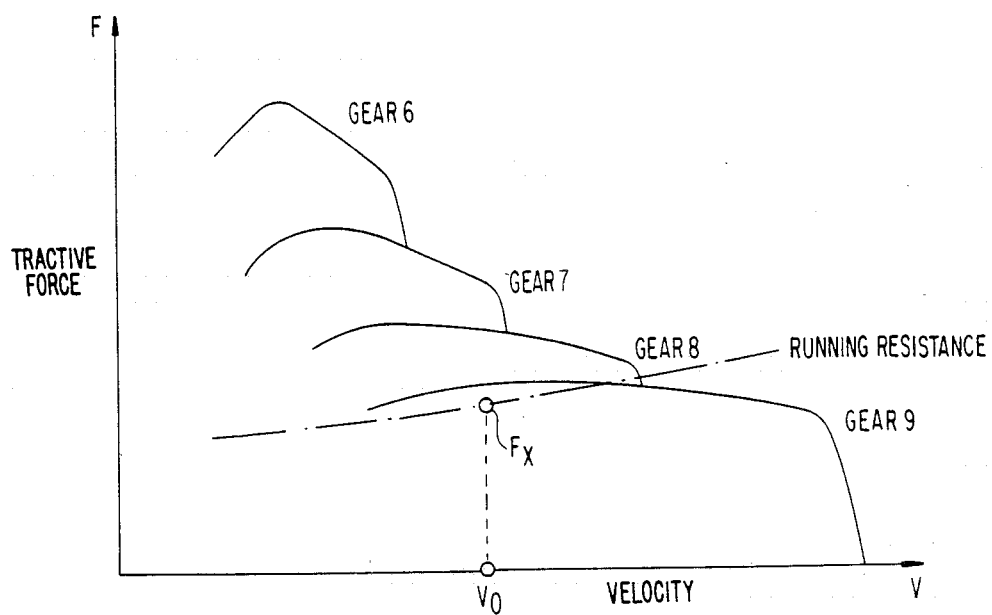
FIG. 2 is a graphical representation illustrating the relationship of tractive force and roadspeed.
Figure 3:
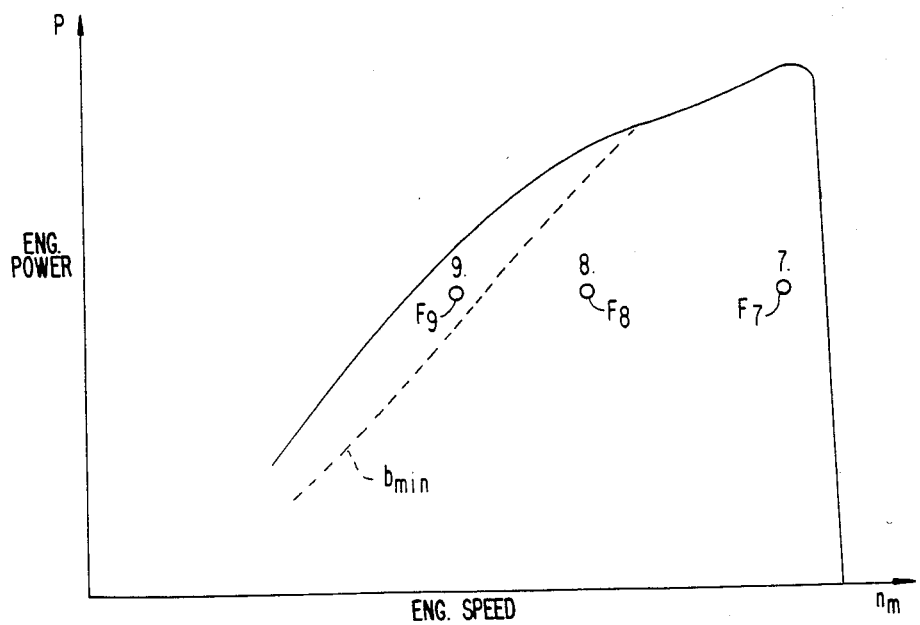
FIG. 3 is a graphical illustration of a curve of optimum efficiency with respect to power and engine speed.

FIGS. 2 and 3 provide an example of the influence a selected gear has on the fuel consumption of the engine 1. More particularly, FIG. 2 shows, for example, a tractive force F of a commercial vehicle in four different gears, namely, sixth, seventh, eighth, and ninth gear. As shown in FIG. 2, for a running resistance line, the vehicle may be driven at a speed $v_o$ in the seventh, eighth, and ninth gears.

FIG. 3 provides an example of the engine power P of the motor vehicle under a full load as a function of the engine speed $n_M$ along with a curve of minimum power-related fuel consumption $b_{min}$, that is, maximum engine efficiency, from which the speed at which the engine furnishes a specific power with the least fuel consumption can readily be determined. If, for example, the operating point $F_x$ is transferred from the graphical illustration of FIG. 2 with the corresponding transmission ratios of the seventh, eighth, and ninth gear, it is possible to obtain the points designated $F_7$, $F_8$, $F_9$ and, as apparent from FIG. 3, it can easily be seen that the ninth gear provides the optimum fuel consumption conditions while the eighth gear and, above all, the seventh gear, with the same engine power P provides an undesirably high fuel consumption.

Figure 4:
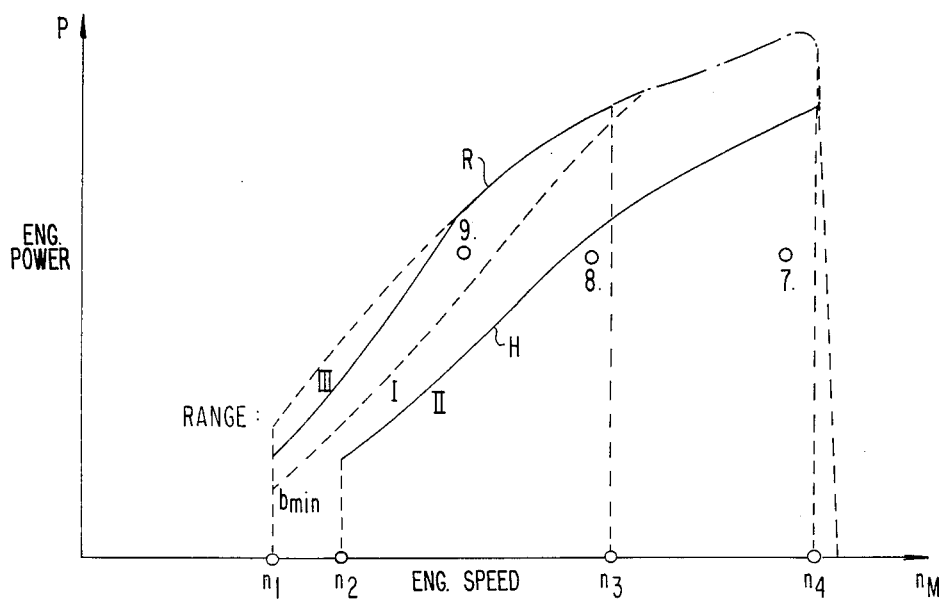
FIG. 4 is a graphical illustration of an optimum range for engine power relative to speed according the process and apparatus of the present invention.

The present invention provides an arrangement for checking the operating point determined by way of the measured various parameters as to whether the operating point lies in the powergraph of FIG. 4, in a range which is determined by the curve of maximum efficiency $b_{min}$ and which may, on the other hand, also be covered by existing transmission ratios. In FIG. 4, the optimum operating range I is constructed so that a horizontal extent, starting from a just selected gear of the transmission 2, is proportional to a gear ratio spacing to the next higher or next lower gear, with limits H and R extending symmetrically, in terms of fuel consumption, to the curve of maximum efficiency $b_{min}$. This means that the same fuel consumption is established at both limits R and H with the same engine power. There may be as many ranges as there are different gear ratio spacings between the individual gears; however, only the range between the eighth and ninth gears are shown in FIG. 4.

In FIG. 4, the optimum range I is limited by the shifting limits H and R, ordinates $n_1$, $n_2$, an abscissa axis $P=0$, and a length of a full load curve between $n_3$ and $n_4$. The ranges designated II and III, which are more unfavorable with respect to fuel consumption, lie outside of the optimum range I, with the range II being limited by the shift up limit H, the ordinate $n_2$, the abscissa $P=0$, and the cutoff curve at maximum engine speed. The range III is limited by the full load curve, the ordinate $n_1$ and the shift down limit R. By virtue of the sensors 7, 9, 10, 5, and 8 or 13, the computing means 6 determines an instantaneous operating point of the combination of the engine 1 and transmission 2 and checks in which of the ranges I, II, or III the engine operating point is located. Since the shifting limits H and R are offset relative to one another by one gear-ratio spacing of the respective gears in the transmission 2, it is guaranteed that the engine 1 may deliver, in the next higher gear, the power of any operating point lying below the shifting limit H. Consequently, a situation can never arise wherein the operating point of the engine 1 moves from the unfavorable range II into the unfavorable range III as a result of the shifting operation but rather, after a completion of a shift signal, the operating point always moves nearer to a curve of minimum fuel consumption $b_{min}$ than was the situation prior to a shifting of the transmission 2.

The shifting limits R and H may be imperically simply determined and stored in the memory of the computer means 6 since such shifting limits R and H represent a quantity which is characteristic of a particular combination of an engine 1 and transmission 2 and of a variation which is fixed by the particular engine/transmission combination. The shifting limits R and H fixed in this manner may be adjusted as a function of the vehicle acceleration and/or the grade of the road surface on which the vehicle is being operated. If, for example, the engine operating point lies on a portion of the shift-down limit which is associated with the greatest possible engine power, i.e., outside of the range III, it can be concluded that the vehicle is to be accelerated sharply it may be concluded from FIG. 4 that the vehicle is to be accelerated sharply or in extreme ascending road grade is to be negotiated. For this purpose, the switch 10, i.e., the kick-down switch, may be used for determining the accelerating pedal position thereby providing an additional criterion for recognizing the above noted operating state of the motor vehicle.

When the speed of the engine 1 approaches the value $n_3$ from below, a shift down is advisable only if the maximum engine power is required for negotiating ascending road grades at high speeds. In acceleration operations, a shift down is not worthwhile when the value $n_3$ is approached since, after a shift to the next gear, the engine speed $n_4$ and shifting limit H would quickly be exceeded and, consequently, the range II in which a shift up would have to be made would be reached. In this situation, it is then more favorable to enlarge the optimum range so as to produce a variable speed threshold which may be determined by, for example, the following relationship:

$$n'_3 = (1/x) \times n_3,$$

wherein x increases with increasing acceleration and preferably moves between the limits $x=1$, in a situation of an acceleration 0 and $x=1+\frac{1}{2} i_{sp}$ in a situation of a sharp acceleration. The quantity $i_{sp}$ corresponds to a gear ratio spacing to the next lower gear.

When ascending road grades are to be negotiated, the shifting times of the mechanical transmission 1 may, in the case of a gear shift, result in a lowering of the vehicle speed. For this purpose, it is advantageous to adjust the shifting limits variably as a function of the grade of the road surface over which the vehicle is traveling. Therefore, in this situation, a shift to a next higher gear would be made only at a higher engine speed than that determined by the original shifting limit H for otherwise the engine 1 is operated in an unfavorable range III or may no longer deliever the necessary power because the full load curve would have to be exceeded. Conversely, when the speed of the vehicle increases during a shifting operation on a descending road grade, the points of the shifting limit H may be adjusted toward lower engine speeds. Consequently ascending and descending road grades influence a horizontal extent of the range I which is favorable in terms of fuel consumption.

To determine the ascending and descending road grades, it is possible to utilize the measured quantities of engine torque, vehicle speed or transmission output speed, and vehicle acceleration which, by means of known motion equations, permit a determination even when the mass of the vehicle is also be taken into account. This can either be measured by a further sensor or supplied through an external variable input to a program store in the computing means 6. For this purpose, a switch 5 may, for example, be positioned in one of three positions such as, for example, 0, $\frac{1}{2}$ and 1 as a function of a load state of the motor vehicle. The switch 5 may, for example, be disposed in a cab or passenger cell of a motor vehicle. The range switch 5 enables the mass of the vehicle to be taken into account in a very simple manner.

Figure 5:
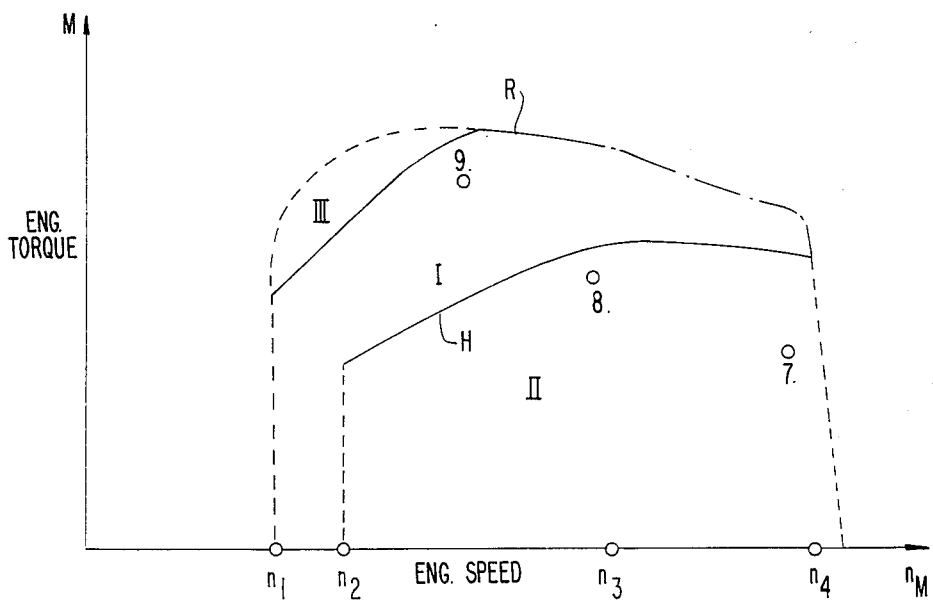
FIG. 5 is a graph of an optimum engine torque relative to speed in accordance with the process and apparatus of the present invention.

For a practical operation of the improvement of the present invention to determine the torque of the engine instead of engine power, it is advantageous for a check to be made when the process is carried out, as to whether the instantaneous operating point lies in an optimum range and, as shown in FIG. 5, in contrast to the power graph of FIG. 4, a line parallel with the abscissa on which the engine operating point in the power graph moves during a gear shift merges into a hyperbola.

A shown in FIG. 5, to plot a torque speed graph, it is necessary to measure the speed of the engine 1 and the engine torque through appropriate sensors. Advantageously, in accordance with the present invention, the engine speed is measured by way of an inductive measuring sensor 7 on a toothed rim of the fly wheel of the engine 1. The torque of the engine 1 may be measured indirectly through measurement of the time period of injection which, with engines having a fuel injection, may be carried out through an opening time of injection nozzles (not shown) of the fuel injection system. For this purpose, the measuring sensor 13 may, for example, sense the movement of the nozzle needle of the injection nozzles inductively. The measuring sensor 13 supplies a start/stop signal for enabling a time measurement which may be carried out simply by appropriate conventional electronic means in the computing means 6 with a high degree of accuracy. However, it is also possible in accordance with the present invention, to measure the engine torque by a known torque measuring sensor 8.

Figure 6:
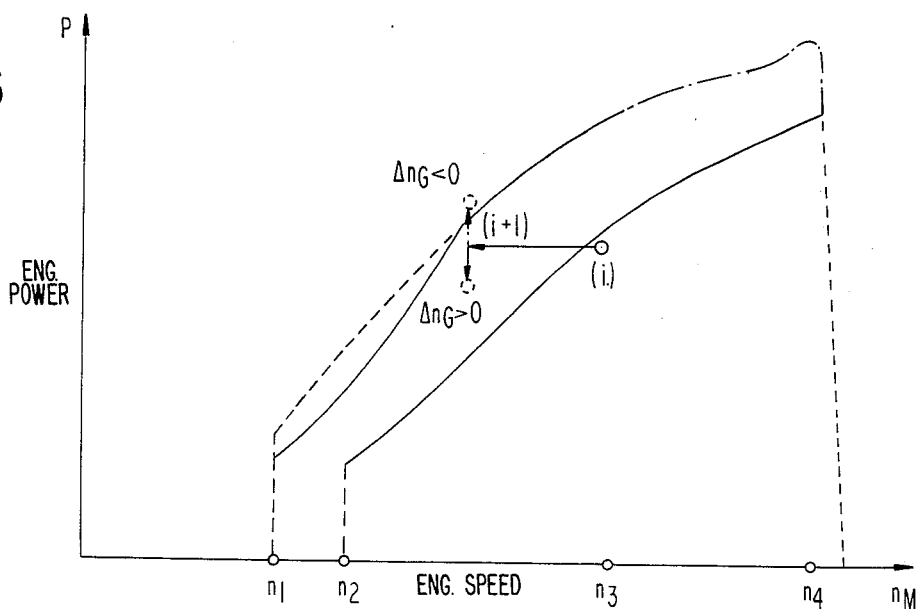
FIG. 6 is a graphical illustration of the engine power relative to speed according to the process and apparatus of the present invention.

FIG. 6 provides a graphical illustration of the influence of varying transmission efficiency in the individual gears, as a function of engine power and engine speed has on the establishment of the optimum range I. As can readily be appreciated, a varying or variable transmission efficiency may be taken into account in a curve trend of the shifting limits H, R. In FIG. 6, after a shifting up from the gear (i) to a gear (i+1), a lower engine power is required in the case of a constant tractive force of the motor vehicle, i.e., uniform road grade and uniform vehicle speed, when the efficiency in the gear (i+1) is higher than the gear (i), that is, $\Delta\eta_G > 0$. The result of this is that, with the view toward the least possible fuel consumption, a shift up would be made at a lower speed than indicated by the original shifting limit H and the range I thereby becomes narrower. Conversely, this power band or range extends further in a horizontal direction when the transmission efficiency in the gear (i+1) is less than or lower than in the gear (i), that is, $\Delta\eta_G < 0$. Since the efficiency of the individual gears differ only slightly from one another, it is sufficient to adapt the trend of the shifting limit H accordingly. In the case of greater deviations, that part of the shifting limit R which is not identical to the full load curve is also adjusted so that the two shifting limits run, as far as possible, "symmetrically" in terms of fuel consumption, to the curve of maximum engine efficiency ($b_{min}$).

Figure 7:
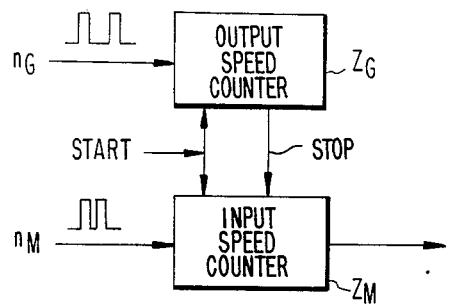
FIG. 7 is a diagrammatic representation of the means for determining a gear transmission signal in accordance with the present invention.

In accordance with the present invention, the method of measuring the transmission ratio may be accomplished, as shown most clearly in FIG. 7, by including two counters $Z_G$, $Z_M$ in the control means 6 to which the transmission output speed $n_G$ and the transmission input speed or engine speed $n_M$ are supplied. The counters $Z_G$ and $Z_M$ are adapted to commence running in response to a common start signal with the counter $Z_G$ sending a stop signal to the counter $Z_M$ when the transmission output speed $n_G$ reaches a specific value $z_G$. The value $z_M$ of the counter $Z_M$ corresponds precisely to the gear transmission $i_G$, with the result being independent of the vehicle speed and vehicle acceleration. The above noted relationship may be best illustrated by the following equations:

$$t_z = (z_G/n_G) = (z_M/n_M),$$

wherein:
$t_z$ equals the counting time of the counters $Z_G$ and $Z_M$.

From the above relationship it follows that:

$$z_M = z_G \times (n_M/n_G).$$

with $z_G$ equal a constant and $i_G = (n_M/n_G)$, and $z_M$ approximately equal $Z_M \sim i_G$ is obtained, that is, the predetermined counter $z_M$ is proportional to a gear transmission $i_G$.

The control means may be a microprocessor of a conventional construction which is provided with a main memory and a program memory, with the fixed engine and transmission data being filed in the program memory.

Figure 8:
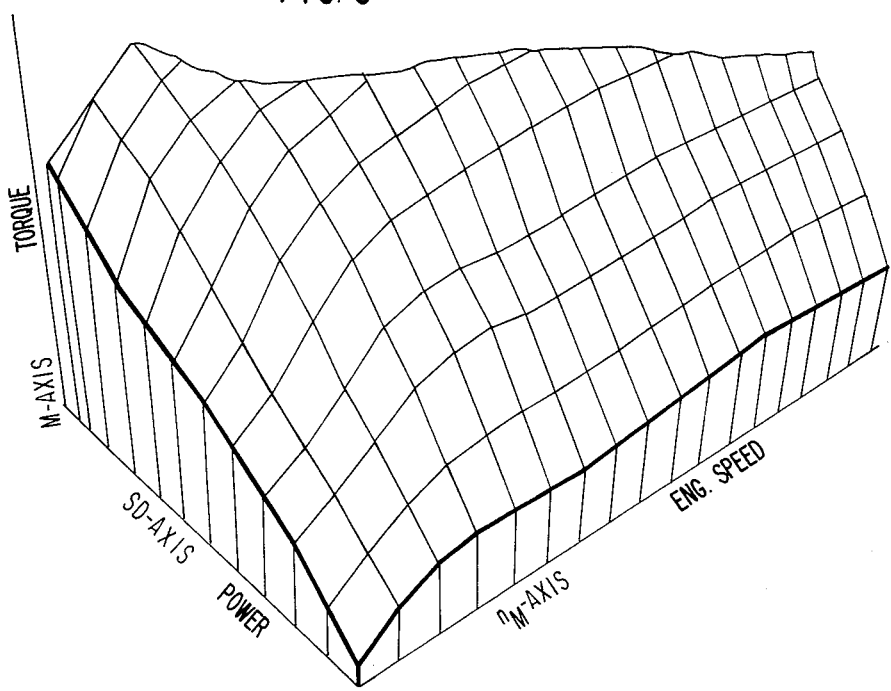
FIG. 8 is a graphical representation of an engine torque as a function of an injection time or period and engine speed with a process and apparatus in accordance with the present invention.

FIG. 8 provides a three dimensional surface representation which may be stored, in the form of coordinates, for example, as a tabulation in the program memory of a relationship between an injection period SD and engine torque M as a function of an engine speed $n_M$.

As a result of the improvement of the present invention, more accurate gear shifting recommendations may be provided than previously since, with the optimum range I being fixed, it is guaranteed that, after a shifting of the gears of the transmission 2, the operating point is, in all cases, nearer to a curve of maximum efficiency than was the case before a shifting operation.

While we have shown and described only one embodiment in accordance with the present invention, it is understood that the same is not limited thereto but is susceptible of numerous changes and modifications as known to one have ordinary skill in the art and we therefore do not wish to be limited to the details shown and described herein, but intended to cover all such modifications as are encompassed by the scope of the appended claims.

We claim:

1. In an engine-driven vehicle in which a transmission having graduated gear ratios couples the engine and a traction system thereof to drive the vehicle along a road, the improvement comprising:
   a device for producing gear-shifting signals for use and effecting, manually or automatically, a gear change in the transmission, said device including:
   sensing means for sensing operating parameters including engine and vehicle speed,
   control means responsive to said sensing means for determining the time instance of producing said gear-shifting signals during operation of the vehicle, and
   manual switch means operable by a driver of the vehicle for supplying a mass signal to said control means for altering the operation of said transmission to account for ascending and descending gradients of the road according to the mass of the vehicle, said mass signal being representative of vehicle load.

2. The improvement as recited in claim 1, wherein the engine comprises an internal combustion engine having fuel injection means for injecting fuel into the engine through injection nozzle means, said nozzle means including movable needle means which open and close for controlling the amount of fuel injected into said engine, wherein said sensing means comprises inductive sensor means for inductively sensing movement of said needle means and wherein said control means is responsive to said inductive sensor means to measure the opening time of the needle means and to determine the time instance of producing said gear-shifting signals on the basis of the measured opening time of said needle means.

* * * * *